No. 722,874. PATENTED MAR. 17, 1903.
J. C. McINTYRE.
MACHINE FOR CUTTING GREEN CORN FROM THE EAR.
APPLICATION FILED DEC. 29, 1900.
NO MODEL. 2 SHEETS—SHEET 1.

Witnesses:
E. A. Volk.
F. F. Schyinger

John C. McIntyre Inventor
By Wilhelm Bonner
Attorneys.

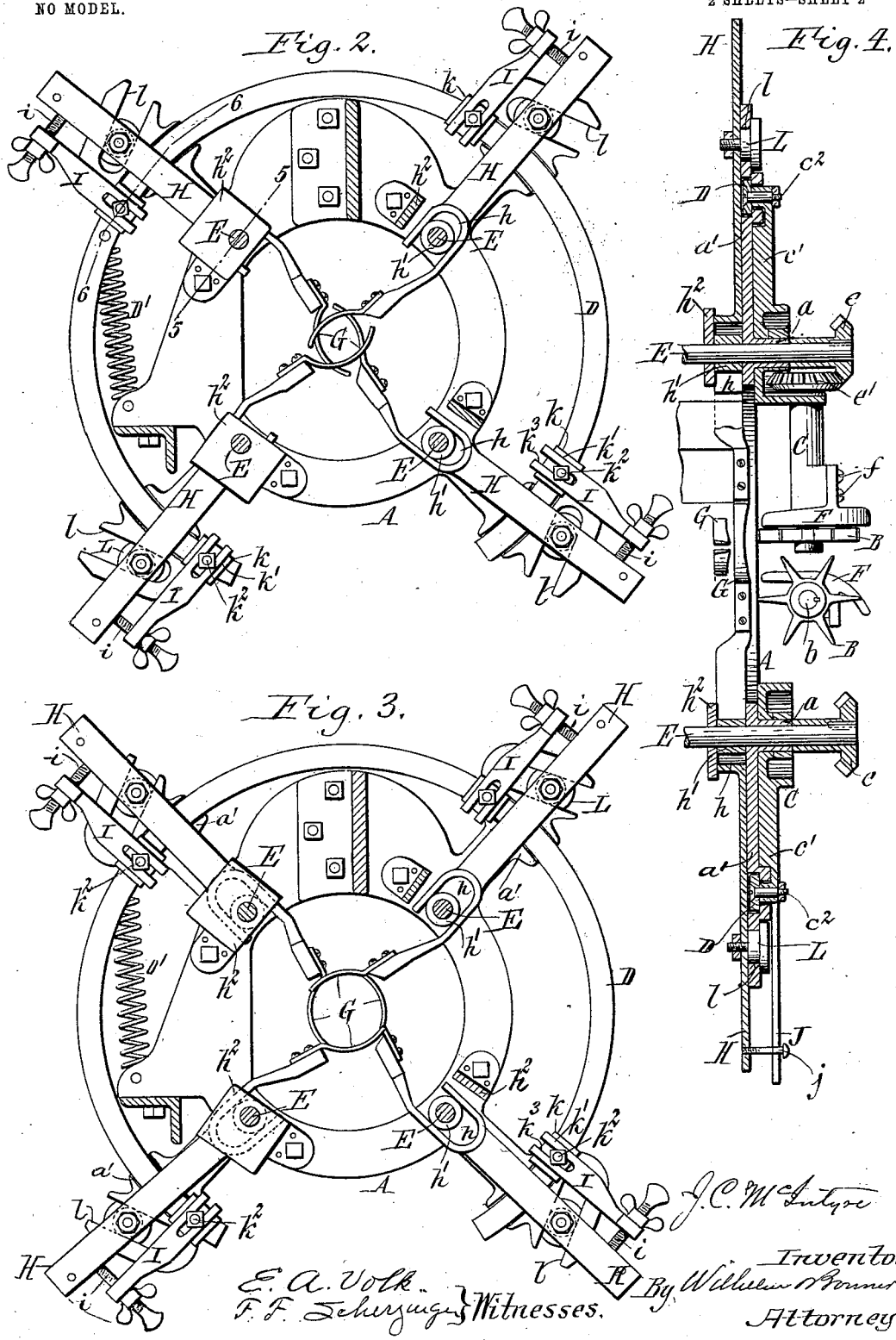

UNITED STATES PATENT OFFICE.

JOHN C. McINTYRE, OF HOOPESTON, ILLINOIS, ASSIGNOR TO SPRAGUE CANNING MACHINERY COMPANY, OF CHICAGO, ILLINOIS, A CORPORATION.

MACHINE FOR CUTTING GREEN CORN FROM THE EAR.

SPECIFICATION forming part of Letters Patent No. 722,874, dated March 17, 1903.

Application filed December 29, 1900. Serial No. 41,524. (No model.)

*To all whom it may concern:*

Be it known that I, JOHN C. MCINTYRE, a citizen of the United States, residing at Hoopeston, in the county of Vermilion and State of Illinois, have invented new and useful Improvements in Machines for Cutting Green Corn from the Cob, of which the following is a specification.

This invention relates to green-corn-cutting machines in which the ears of corn are fed between curved cutters, which cut the kernels from the cob and in which the feed mechanism and cutters are automatically adjusted to the different sizes of ears which are being operated upon. A machine of this character is shown and described in Letters Patent of the United States No. 256,926, dated April 25, 1882.

The objects of this invention are to provide means whereby the cutters are retained in an approximately concentric position with reference to the corn which is being cut in all positions of the cutters, to provide means whereby the throw of the cutters may be readily adjusted to suit different sizes of corn, to provide simple means for detaching the cutters from the machine for sharpening or repairing the same, and to improve the machine in other respects.

Figure 1:
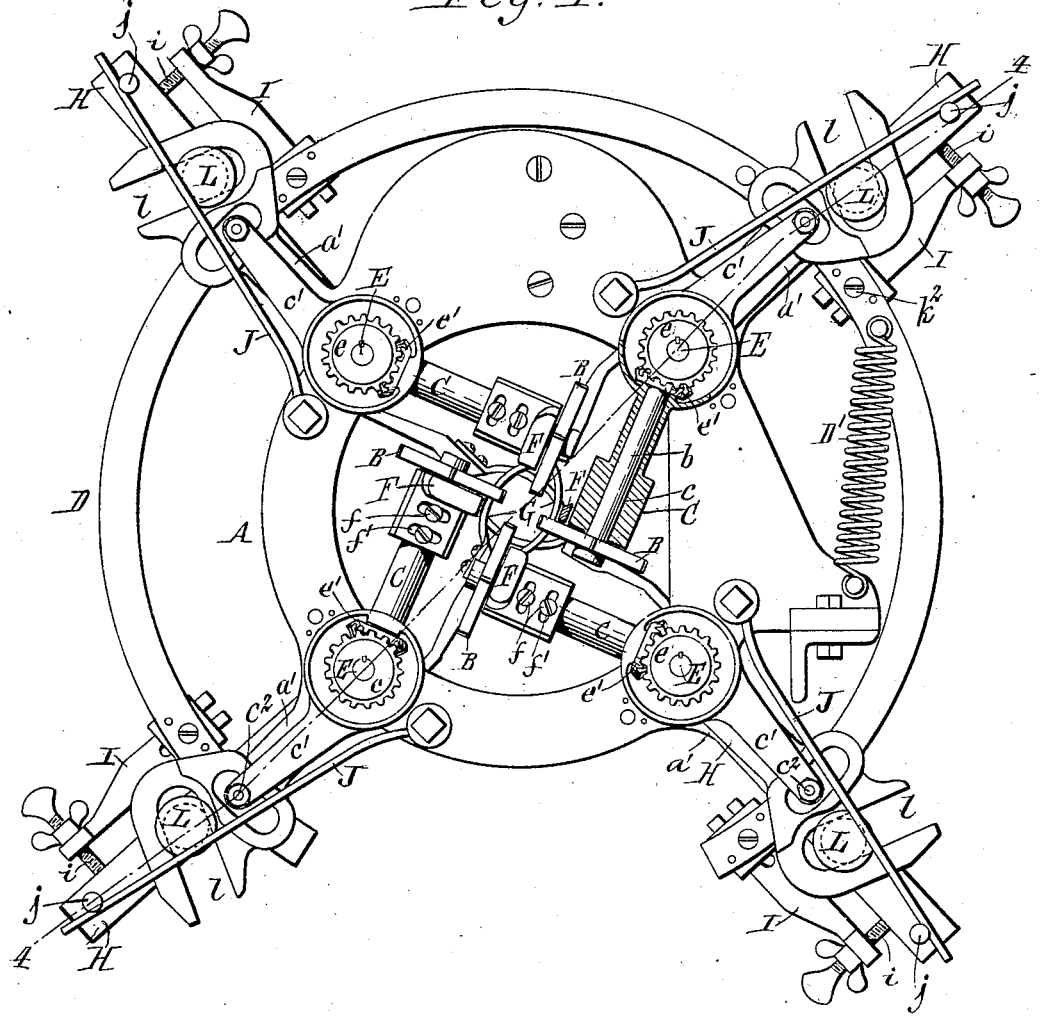
Figure 5:
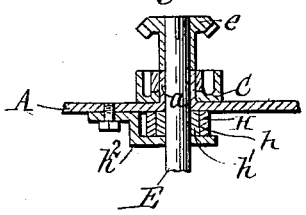
Figure 6:
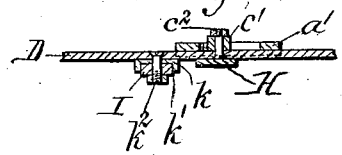

In the accompanying drawings, consisting of two sheets, Figure 1 is a front elevation, partly in section, of the front head of a corn-cutter embodying my improvements and showing the cutter and feed mechanism in its contracted position. Fig. 2 is a sectional rear elevation of the same on a reduced scale. Fig. 3 is a view similar to Fig. 2, showing the cutter and feed mechanism expanded. Fig. 4 is a transverse section in line 4 4, Fig. 1. Fig. 5 is a fragmentary cross-section in line 5 5, Fig. 2, showing the journal of one of the driving-shafts and the support of one of the cutter-bars. Fig. 6 is a similar section in line 6 6, Fig. 2, showing the means for connecting one of the presser-bars to the connecting ring or segment and also adjacent parts.

Like letters of reference refer to like parts in the several figures.

A represents the transverse front head of the machine, which forms a part of the stationary frame of the machine and which supports the corn feeding and cutting mechanism. This head is provided with an opening in its center, through which the ears are fed axially by toothed feed or spur wheels B. Four of these wheels are arranged equidistant around the path of the ears of corn, and each wheel is secured to the inner end of a feed-shaft $b$, which is arranged on the front side of the supporting-head and tangentially with reference to the axis thereof. Each feed-shaft $b$ is journaled in a bearing $c$, formed on the inner arm of a rock-lever C, which is pivoted on the head, so as to swing transversely. Each of the rock-levers is pivoted on a boss $a$, formed on the supporting-head, and the outer arms $c'$ of the several rock-levers are loosely connected by bolts $c^2$ with an oscillating split ring or segment D. This ring is guided in the outwardly-projecting arms $a'$ of the supporting-head, so as to turn concentrically with the path of the ears of corn. As the ears of corn pass between the feed-wheels the latter are spread or expanded more or less, according to the diameter of the ears of corn. The rock-levers are caused to turn in unison by means of the ring D, connected with the outer arms of the rock-levers. The forward movement of the ring D is produced by the ears of corn passing between the feed-wheels, and when the ears of corn clear the same the ring is moved backwardly by a spring D', which connects the ring with the supporting-head or some other stationary part of the frame, thereby causing the feed-wheels and other parts mounted on the inner arms of the rock-levers to expand and contract uniformly. Each of the feed-wheels is turned in the proper direction for feeding the ears of corn forwardly through the machine by a longitudinal driving-shaft E, which is journaled near its front end in one of the bosses $a$ and is provided at its front end with a bevel gear-wheel $e$, which meshes with a corresponding gear-wheel $e'$ on the outer end of the adjacent feed-wheel shaft $b$. The driving-shafts E of the several feed-wheels may be turned simultaneously in the manner described in the Letters Patent referred to or in any other suitable way.

F represents gages which are mounted on the rock-arms adjacent to the outer side of the feed-wheels and which are adapted to regulate the depth of cut of the knives or cutters as they pass through the kernels of corn on the cob. Each of these gages is secured to the inner arm of the adjacent rock-lever, so as to be capable of transverse adjustment thereon by means of screws $f$ passing through transverse slots $f'$ in the gage and entering threaded openings in the rock-arm. The front end of each gage is curved or inclined outwardly, so that the several gages together form an outwardly-flaring throat, which facilitates the entrance of the ears of corn between the same. As the ears of corn are fed forwardly by the feed-wheels the outer ends of the kernels thereof engage with the gages and spread the same, together with the feed-wheels and the inner arms of the levers supporting the same. The gages are so adjusted that the teeth of the feed-wheels project sufficiently beyond the inner side or face of the gages that said teeth pass through the kernels and partly embed themselves in the cob of the ear of corn, thereby permitting the feed-wheels to obtain a firm grip upon the corn for feeding the same positively forward.

G represents the knives, blades, or cutters whereby the kernels are cut from the cob of corn and which are curved or crescent-shaped. Two pairs of these cutters are arranged one behind the other, the two cutters of each pair having their concave sides facing each other, and the cutters of one pair being arranged substantially at right angles to the cutters of the other pair, so that the several cutters together form practically a continuous annular or circular cutter, as shown in Figs. 1, 2, and 3. The several cutters are arranged in rear of the feed-wheels, and each cutter is arranged with its central portion in line with the space between the face of the corresponding gage and the end of the inner teeth of the feed-wheel, which causes the cutters to cut the kernels of corn between the crown or top of the kernels and the root or base thereof.

H represents cutter-bars which support the cutters and which are arranged equidistant and substantially radial on the rear side of the supporting-head. The cutter-bars are four in number, and each bar carries one of the cutters at its inner end. The middle part of each cutter-bar is provided with a socket $h$, which receives a pivot $h'$, consisting, preferably, of a roller or sleeve mounted on the adjacent driving-shaft in rear of the supporting-head. The cutter-bar is confined upon the pivot $h'$ by a bracket $h^2$, which is secured to the rear side of the supporting-head and which embraces the driving-shaft in rear of the pivot $h'$.

The outer ends of the cutter-bars are connected with the oscillating ring D in such manner that when the ring is moved by the ears of corn passing between the feed-wheels and the gages on the inner arms of the rock-levers the cutter-bars are also moved in the same direction, so that the cutters are expanded and contracted simultaneously with the feed-wheels and gages. As shown in the drawings, the outward or expanding movement of the cutter is produced by a presser-bar I, secured at its inner end to the connecting-ring D and provided at its outer end with an adjusting-screw $i$, which bears against one side of the cutter-bar at the outer end thereof. As the ring is turned forwardly by the ears of corn passing between the feed-wheels and gages, the screws $i$ by pressing against the outer ends of the cutter-bars turn the latter in the same direction as the rock-levers carrying the feed-wheels and gages. The cutter-bars are held yielding turned in the direction for contracting the cutters by springs J, secured to the supporting-head and bearing against pins or studs $j$ on the outer ends of the cutter-bars, as shown in Figs. 1 and 4. By this means the cutters are separated positively when an ear of corn passes between the feed-wheels; but the latter are permitted to contract and grasp the next following ear while the cutters are still expanded and held yieldingly in cutting position against the previous ear which has passed the feed-wheels. It will thus be seen that the ears of corn are centered upon passing between the gages F, and the latter are spread more or less, according to the diameter of the ears of corn, whereby the cutters in rear of the gages are moved relatively to the ears of corn through the medium of the intermediate mechanism, which transmits the lateral movement of the gages to the cutters, whereby the kernels are cut properly from ears of corn of different diameters.

When the machine is in operation, the position of the cutters is controlled principally by the position of the gages which bear against the outer ends of the kernels of the ear of corn as the latter passes between the gages, and in order to vary the depth of cut according to the length of the kernels of corn the position of the cutters relatively to the gages may be shifted, as required. This is effected by turning the adjusting-screws $i$ on the presser-bars forward or backward until the cutters stand in the desired position with reference to the gages. If the cutters are adjusted outwardly so as to be more nearly in line with the face of the gages, then the cutters will produce a shallow cut in the kernels of corn, while if the cutters are adjusted so that they are moved a considerable distance inwardly from the face of the gages the cutters will cut the kernels of corn comparatively deep or nearer the base of the kernels.

On ears of corn of comparatively small diameter the kernels are usually short, while on ears of corn of large diameter the kernels are longer. For this reason the adjusting-screws are arranged to bear against the cutter-bars at a greater distance from the fulcrum thereof than the distance from the fulcrum of the rock-levers which carry the gages to the point of connection between the rock-levers and the connecting-ring D. By this means the relative expansion and contraction of the cutters will be less than that of the gages and cause the cutters when properly set for producing a shallow cut of the kernels on ears of small diameter to produce a deeper cut in the kernels of ears of larger diameter, because the cutters do not expand the same extent of the gages. By shifting the presser-bars I inwardly or outwardly, so that the screws $i$ bear against the cutter-bars at a point nearer the fulcra thereof or more remote therefrom, the relative lateral movement of the cutters with reference to the gages can be adjusted according to the variation which exists in the diameter of the ears of corn which are to be cut. By adjusting the presser-bars inwardly the screws $i$ thereof bear against the cutter-bars nearer the fulcra thereof, which causes the throw of the cutters to be increased, while upon adjusting the presser-bars so that the screws $i$ bear against the cutter-bars farther away from the fulcra of the latter the throw of the cutters will be reduced. The means for adjustably connecting each presser-bar with the connecting-ring consist of a guide-block $k$, secured to the connecting-ring and provided with a substantially radial guideway $k'$, which receives one of the presser-bars, and a clamping-screw bolt $k^2$, arranged in the guide-block and ring and passing through a longitudinal slot $k^3$ in the presser-bar.

In the machines of this type as heretofore constructed the bars or levers supporting the cutters turned on fixed pivots, and the cutters were curved so as to properly cut the kernels from the smallest ears of corn. As the cutters were expanded by the passage of a larger ear of corn between the same the outer or free ends of the curved cutter would be thrown farther away from the ear than the inner or attached ends thereof, which caused the cutters to produce an eccentric cut on the kernels of corn and limit the size of corn which it was possible to cut properly with the machine. In order to increase the range of the cutters and permit the cutting of corn of the largest diameter as well as corn of small diameter, the present machine is provided with compensating means which causes the cutters to be moved lengthwise at the same time that they are moved laterally, thereby avoiding the tendency of the cutters to produce an eccentric cut on the corn. This longitudinal movement of the cutters is effected by bolts or projections L, arranged on the outer parts of the cutter-bars and engaging with tangentially-slotted guides or ways $l$ in the arms of the supporting-head. This movement of the cutter-bars is permitted by elongating the sockets $h$ of the bars radially, as shown in Figs. 2 and 3. The inclination of the guides $l$ is so determined that when the cutter-bars are turned forward or in the direction for expanding the cutters they are also moved outwardly lengthwise on their pivots $h'$ by the inclined guideways $l$, whereby the cutters are retained approximately concentric with the corn which is being cut in all positions of the cutters, thereby permitting corn of much greater diameter to be properly cut than has been possible in the machines as heretofore constructed. In Fig. 2 the cutters are shown in their innermost or contracted position, in which position they overlap one another considerably and are capable of cutting the kernels from the smallest corn which is usually fed to the cutters, while in Fig. 3 the cutters are shown in the expanded position which they occupy when large ears of corn are fed to the cutters. It will thus be seen that in all positions of the cutters, whether expanded or contracted, the cutters are always arranged approximately concentric to the ear of corn which is being cut, thereby producing a more uniform cutting of the kernels of corn.

The pivotal support of the cutter-bars is arranged parallel with the path of the ears of corn, and the cutter-bars have a combined turning and sliding movement on these supports at right angles to the path of the corn while adapting the cutters to different sizes of corn, whereby the cutters are always maintained in parallelism with the path of the corn, and the edges of the cutters are always retained in the most effective position, whether expanded or contracted.

In order to permit of conveniently removing the cutter-bars from the machine for sharpening the cutters without dismembering the machine, the socket $h$ of each cutter-bar is open at its inner end and each guideway $l$ is open at its outer end. By thus constructing the sockets $h$ and guideways $l$ each of the cutter-bars can be easily removed from the machine by shifting the same outwardly and laterally, so as to disengage its projection L from the guideway $l$ and its socket $h$ from the pivot $h'$, and by the reverse operation the cutter-bar can be readily replaced in the machine.

I claim as my invention—

1. The combination with the cutters which are arranged around the path of the corn to be cut, of pivoted cutter-bars carrying the cutters at their inner ends, rock-levers provided at their inner ends with gages which are adapted to be engaged by the corn to be cut, an oscillating ring or segment connecting the outer ends of the rock-levers, and pressing devices which are mounted on said ring and which bear against the cutter-bars at a greater distance from their fulcra than the distance from the fulcra of said rock-levers to the connection of said levers with said ring or segment, substantially as set forth.

2. The combination with the cutters which are arranged around the path of the corn to be cut, of pivoted cutter-bars carrying the cutters at their inner ends, rock-levers provided at their inner ends with gages which are adapted to be engaged by the corn to be cut, an oscillating ring or segment connecting the outer ends of the rock-levers, and radially-adjustable presser devices whereby the movement of said ring or segment is transmitted to the cutter-bars and which permit of adjusting the movement of said cutters, substantially as set forth.

3. The combination with the cutters which are arranged around the path of the corn to be cut, of pivoted cutter-bars carrying the cutters at their inner ends, rock-levers provided at their inner ends with gages which are adapted to be engaged by the corn to be cut, an oscillating ring or segment connecting the outer ends of the rock-levers, presser-bars radially adjustably connected with said ring or segment by screws passing through the ring or segment and through slots in the presser-bars, and adjusting-screws arranged on said presser-bars and bearing against the cutter-bars, substantially as set forth.

4. The combination with the cutters which are arranged around the path of the corn to be cut, of pivoted cutter-bars carrying the cutters at their inner ends, rock-levers provided at their inner ends with gages which are adapted to be engaged by the corn to be cut, an oscillating ring or segment connecting the outer ends of the rock-arms, radial presser-bars extending outwardly from said ring, adjusting-screws arranged on the presser-bars and bearing against one side of the cutter-bars for moving the same forward, and springs whereby the cutter-bars are moved backwardly, substantially as set forth.

5. The combination with the cutters arranged around the path of the corn to be cut, of cutter-bars which carry said cutters, and means whereby a combined pivotal and longitudinal movement is imparted to said cutter-bars, substantially as set forth.

6. The combination with the cutters arranged around the path of the corn to be cut, and the gages which are shifted by the corn on its way to the cutters, of cutter-bars which carry said cutters and which are capable of a combined pivotal and longitudinal movement, and intermediate mechanism whereby said cutter-bars are actuated by the movement of said gages, substantially as set forth.

7. The combination with the supporting-head of a corn-cutter, of cutters arranged around the path of the corn to be cut, cutter-bars carrying the cutters at their inner ends and provided at their middle with elongated sockets which receive pivots on the supporting-head, inclined guides arranged on the supporting-head and receiving bolts or projections on the outer ends of the cutter-bars, gages arranged around the path of the corn and adapted to be moved by the corn on its way to the cutters, rock-levers carrying the gages, a ring or segment connecting said levers, and pressers mounted on the ring or segment and bearing against the outer ends of the cutter-bars, substantially as set forth.

8. The combination with the cutters arranged around the path of the corn to be cut, of cutter-bars carrying the cutters at their inner ends and provided with inwardly-opening sockets which receive the pivots thereof, substantially as set forth.

9. The combination with the cutters arranged around the path of the corn to be cut, of cutter-bars carrying the cutters at their inner ends and provided at their middle with elongated guide-sockets which open inwardly and receive the pivots thereof, and bolts or projections arranged on the outer ends of the cutter-bars and engaging with inclined slotted guides which open outwardly, substantially as set forth.

10. The combination with the cutters arranged around the path of the corn to be cut, of cutter-bars carrying the cutters at their inner ends and provided at their middle with elongated guide-sockets which open inwardly and receive the pivots thereof, bolts or projections arranged on the outer ends of the cutter-bars and engaging with inclined slotted guides which open outwardly, gages adapted to be moved by the corn on its way to the cutters, rock-levers carrying the gages, a ring or segment connecting said rock-levers, and presser-bars arranged on the ring or segment and bearing against the outer ends of the cutter-bars, substantially as set forth.

11. The combination with the cutters which are arranged around the path of the corn to be cut and the feed mechanism whereby the corn is moved lengthwise past the cutters, of cutter-bars which carry said cutters and which are capable of a combined pivotal and sliding movement in a plane at right angles to the path of the corn, whereby the cutters are adjustable to corn of different diameters and always remain concentric with the corn, substantially as set forth.

12. The combination with the cutters which are arranged around the path of the corn to be cut and the feed mechanism whereby the corn is moved lengthwise past the cutters, of cutter-bars which carry said cutters, pins or rollers which are arranged parallel to the path of the corn and upon which said bars are supported, and a shifting mechanism whereby said bars are turned and also moved lengthwise on said pins or rollers in a plane at right angles to the path of the corn, substantially as set forth.

13. The combination with a head arranged substantially at right angles to the line of feed of the corn to be cut, of cutter-bars mounted on said head so as to have a combined pivotal and lengthwise movement on the head, rock-levers carrying gages, connections between said rock-levers and said cutter-bars for moving the latter pivotally, and means for causing the lengthwise movement of said cutter-bars, substantially as set forth.

Witness my hand this 19th day of December, 1900.

JOHN C. McINTYRE.

Witnesses:
M. J. HAWKINS,
P. H. GREENE.